UNITED STATES PATENT OFFICE.

RICHARD PARKE AND HENRY GOLDBERG, OF NEW YORK, N. Y.; SAID PARKE ASSIGNOR TO SAID GOLDBERG AND ISAAC GOODMAN, OF SAME PLACE.

COMPOSITION FOR SIZE.

SPECIFICATION forming part of Letters Patent No. 283,652, dated August 21, 1883.

Application filed July 5, 1883. (No specimens.)

*To all whom it may concern:*

Be it known that we, RICHARD PARKE and HENRY GOLDBERG, of New York, in the county and State of New York, have invented a new and Improved Composition for Size, of which the following is a specification.

Our invention consists in making a composition for size free from the objectionable features of ordinary sizing, of which glue is an ingredient, and in which the glue decays and decomposes and gives rise to unpleasant and offensive odors.

Our composition consists of the following ingredients, combined in about the proportions stated, viz: Gum-thus, one and one-half pounds; shellac, (bleached or shell,) three ounces; manila-gum, two ounces. These ingredients are added to a solution of caustic soda, made by dissolving one-fourth of a pound of the soda in about one gallon of water. The gums are dissolved in the caustic soda. This solution is then filtered or strained, and to it is or may be added raw linseed or other oil in the proportion of one gill of oil to one gallon of the solution.

Gum-thus is a soft gum, and least expensive. The other gums are added to it in order to make it harder, as, if it is too soft, it will when dry brush off, not having sufficient adhesive force to bind it to the surface to which it has been applied. Caustic soda is used because it is a good solvent and is very inexpensive, while the oil is added to prevent the gum from becoming white in color when dry.

Instead of shellac and manila-gum, other hard gums may be used as equivalents, and the oil may be omitted when a white color is desirable. The size thus made can be made and retailed at an exceedingly low price.

This composition can be used in the preparation of walls, in paper-making, calcimining, painting, and, in fact, wherever size can now be used. It will adhere firmly to the surface, and will not chip off, like glue sizing.

We claim—

1. A composition for size, consisting of gum-thus, hard gum, and caustic soda dissolved in water, substantially in the proportions as specified.

2. A composition for size, consisting of gum-thus, hard gum, caustic soda dissolved in water, and of oil, substantially in the proportions as specified.

RICHARD PARKE.
HENRY GOLDBERG.

Witnesses:
JAMES TURK,
WILLY G. E. SCHULTZ.